United States Patent [19]
Hayden, Sr.

[11] Patent Number: 5,249,485
[45] Date of Patent: Oct. 5, 1993

[54] BANDSAW BLADE AND METHOD OF MANUFACTURING SAME

[75] Inventor: Robert C. Hayden, Sr., Branford, Conn.

[73] Assignee: Sandvik AB, Sandviken, Sweden

[21] Appl. No.: 814,791

[22] Filed: Dec. 31, 1991

[51] Int. Cl.$^5$ ............................................. B23D 65/00
[52] U.S. Cl. .................................. 76/112; 76/DIG. 2; 83/661
[58] Field of Search ................. 76/112, 101.1, 115, 76/DIG. 2; 83/835, 661

[56] References Cited

U.S. PATENT DOCUMENTS

| | | | |
|---|---|---|---|
| 2,826,941 | 3/1958 | Kolesh | 76/112 |
| 3,078,546 | 2/1963 | Kiernan | 76/115 X |
| 3,104,562 | 9/1963 | Kolesh | 76/117 |
| 3,788,182 | 1/1974 | Tyler | 83/835 |
| 4,674,365 | 6/1987 | Reed | 76/108.1 X |
| 4,688,458 | 8/1987 | Krilov | 83/835 X |
| 4,771,659 | 9/1988 | Schmolke | 76/101.1 X |
| 4,784,033 | 11/1988 | Hayden et al. | 83/661 |

*Primary Examiner*—Frank T. Yost
*Assistant Examiner*—Kenneth E. Peterson
*Attorney, Agent, or Firm*—Burns, Doane, Swecker & Mathis

[57] ABSTRACT

A bandsaw blade comprises a plurality of cutting teeth spaced longitudinally apart by gullets. Each tooth includes a steel portion and a carbide tip brazed to a front face of the steel portion. The deepest point of the gullet lies on a curved section having a relatively large radius of curvature, and is spaced longitudinally forwardly of the trailing carbide tip by a relatively large distance. Transversely spaced corners of the gullet bottom are made smoothly rounded by a shot-peening operation.

6 Claims, 1 Drawing Sheet

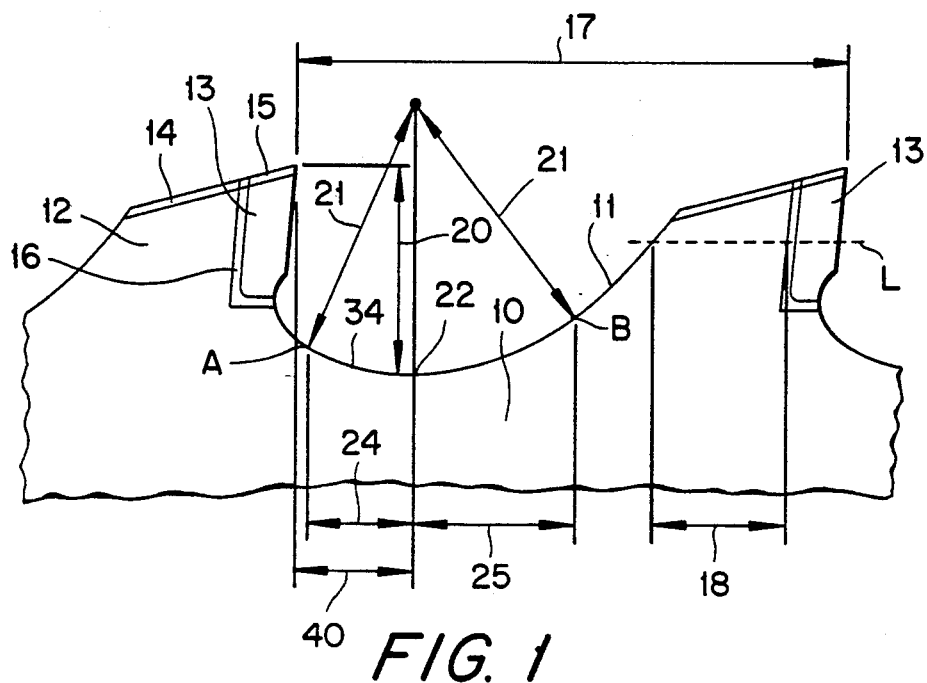
FIG. 1
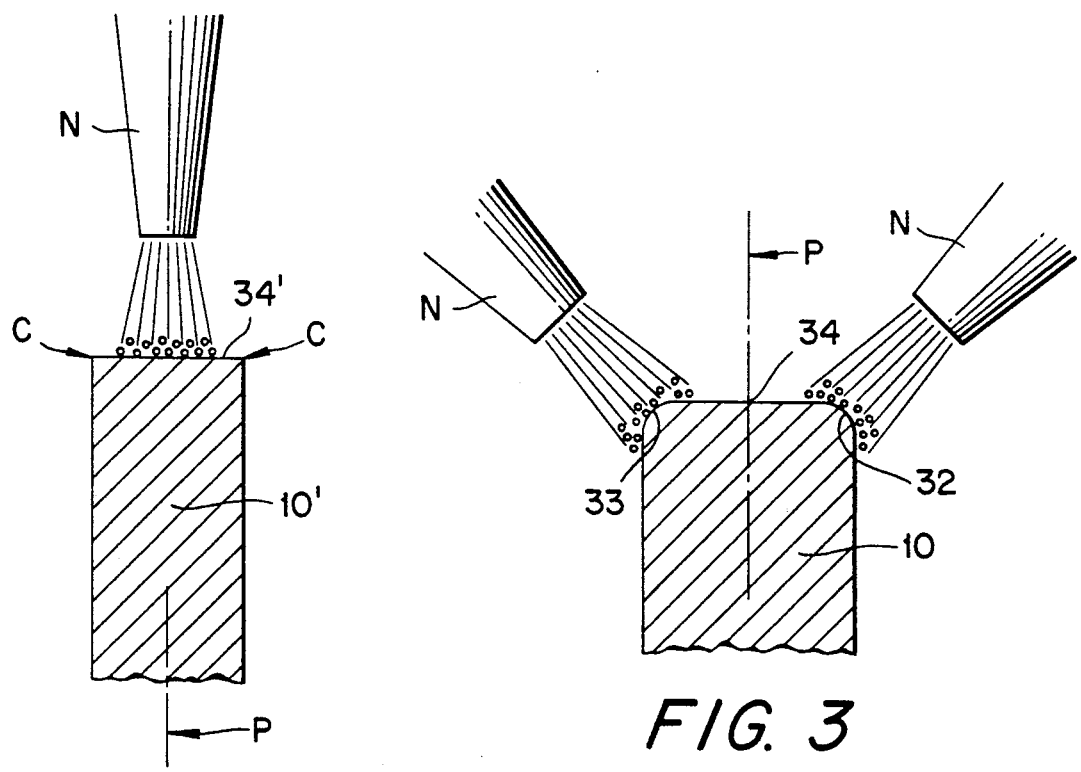
FIG. 2
(PRIOR ART)
FIG. 3

BANDSAW BLADE AND METHOD OF MANUFACTURING SAME

BACKGROUND OF THE INVENTION

The invention relates to carbide tipped bandsaw blades used for cutting metal, and to a method of making bandsaw blades.

Prior to the advent of carbide-tipped bandsaw blades, it had been conventional to form bandsaw blades as so-called bi-metallic blades comprised of a spring steel alloy body to which a high speed steel strip was electron beam welded. A back edge of the body was usually beveled along its opposite corners by means of a cutting operation performed on an edging machine, in order to minimize stress concentrations. Cutting teeth were formed directly in the high speed steel strip by a milling operation. Hence, the transverse width of each tooth equaled the thickness of the band. If desired, some of the teeth could be bent so as to be offset toward opposite sides of the band.

After the teeth were formed, it was been common to grit blast the sides of the blade for cleaning purposes, and/or to grit blast the front edge of the blade to hone or clean the teeth. During a cutting operation, the teeth would wear out, and the body of the band would be subjected to fatigue stress. Because of the heavy stresses imposed on the teeth when entering or leaving a metal workpiece, the teeth would wear relatively rapidly, and the life of the blade (usually less than 100,000 revolutions in a cutting machine) was determined by the wear rate of the teeth. The worn out teeth of such blades were normally not subjected to resharpening operations. Therefore, little emphasis was placed on increasing the fatigue life of the band body, due to the fact that the overall life of the blade itself could not be extended beyond the time when the teeth wore out.

This situation has been changed by the introduction of carbide-tipped bandsaw blades in which carbide cutting tips are brazed onto a small concave surface at an extremity of a tooth portion of the steel and, e.g., see U.S. Pat. Nos. 2,826,941; 3,104,562; 3,788,182; and 4,784,033. The last-named patent further discloses that the inclusion of a ductile metal foil in the braze layer enables the braze joint to accommodate limited deformation, thus allowing the use of large carbide tips on metal bandsaws.

The carbide tips are highly wear resistant and can be resharpened, whereby the life of the carbide tips is extended. However, such extended tip life may be of little benefit if the fatigue life of the blade is considerably shorter than the tip life. Accordingly, it would be beneficial to increase the fatigue life of a carbide-tipped bandsaw blade.

The fatigue failure of the blade results from the twisting and bending of the blade. For example, as the blade travels around the guide wheels of a bandsaw machine, the front cutting edge of the blade bends and is thus subjected to tensile stresses which are directly proportional to the radius of curvature of the guide wheels. The tooth portions of the blade, which include the carbide tips, have a higher degree of flexural stiffness than the gullet portions of the band which separate the teeth. Hence, the primary blade deformation and resulting tensile stresses occur primarily in the gullets, especially at the deepest point of the gullet.

It has been proposed to minimize the stress concentrations in the gullet regions of a bandsaw blade by spacing the deepest point of the gullet longitudinally forwardly of the topmost point of a drilling carbide tip by a distance equal to at least 15% of the pitch of the teeth, and by arranging that deepest point to lie on a curved section of a bottom of the gullet. The curved section, which is defined by a radius of curvature larger than the largest depth of the gullet extends forwardly and rearwardly of the deepest point by longitudinal forward and rearward distances, respectively. Each of the forward and rearward distances is equal to at least 10% of the pitch of the teeth. Notwithstanding the improved fatigue life produced by such a bandsaw blade, it would be further desirable to yet further extend the fatigue life.

SUMMARY OF THE INVENTION

The present invention relates to a bandsaw blade comprising a plurality of teeth spaced longitudinally apart by curved gullets. Each of the teeth comprises a steel portion and a carbide tip brazed onto a front face of the steel portion. The gullet bottom has two transversely spaced corners which are smoothly rounded by shot-peening.

Preferably, each gullet includes a depth defined by a distance from the topmost point to a deepest point of the gullet. The deepest point is spaced longitudinally forwardly from the topmost point of a trailing carbide tip by a longitudinal distance equal to at least 15% of the pitch. The deepest point lies on a curved section of a bottom of the gullet. That curved section is defined by a radius of curvature which is larger than the depth and which extends forwardly and rearwardly of the deepest point by longitudinal forward and rearward distances, respectively. Each of the forward and rearward distances is equal to at least 10% of the pitch.

A method aspect of the invention involves a method of making a bandsaw blade comprising the steps of providing a steel band having a plurality of steel tooth portions spaced longitudinally apart by curved gullets. Each gullet includes a bottom having transversely spaced corners. Carbide tips are brazed onto front faces of the tooth portions. The corners of the gullet bottom are shot-peened prior to the brazing step in order to make those corners smoothly rounded.

The shot-peening step may be performed by two stationary nozzles, each oriented obliquely relative to the plane of the blade. Alternatively, the shot-peening could be performed by traversing a shot-peening nozzle transversely across the gullet bottom.

By rounding the corners of the gullet bottom by a shot-peening operation, the influence of crosswise scratches and flare resulting from the formation of the gullet (whether formed by punching, milling, grinding or laster cutting) is minimized, and the gullet bottom is free of sharp edges where large stresses previously occurred.

The shot-blasting also provides the surface with built-in compressive stresses, which has been proven to delay, by a considerable period, the development of fatigue cracks.

BRIEF DESCRIPTION OF THE DRAWINGS

The objects and advantages of the invention will become apparent from the following detailed description of a preferred embodiment thereof in connection with the accompanying drawings in which like numerals designate like elements, and in which:

FIG. 1 is a fragmentary side elevational view of a carbide-tipped bandsaw blade according to the invention;

FIG. 2 is a cross-sectional view of a conventional shot-peening operation being performed on a band; and FIG. 3 is a view similar to FIG. 2 of a shot-peening operation being performed according to the present invention.

DETAILED DESCRIPTION OF A PREFERRED EMBODIMENT OF THE INVENTION

As shown in FIG. 1, a bandsaw blade comprises a steel band 10. A row of gullets 11 has been machined into a top edge of that band. The gullets are separated longitudinally by teeth. Each tooth comprises a portion 12 of the steel band 10 and a carbide tip 13. The tip, which can be formed of tungsten carbide or similar material with high wear resistance is brazed to the steel portion 12 by means of a braze metal 16. The braze metal may comprise one or more distinct layers possessing different composition, ductility and melting point.

The teeth have a pitch 17 defined as the longitudinal distance between the topmost points of successive tooth tips 13. The depth 20 of the gullet is defined as the vertical distance from the topmost point of the tooth tip 13 to the deepest point 22 of the bottom 34 of the gullet.

To help avoid the generation of fatigue cracks in the steel band 10 during the repeated bending of the saw over the bandsaw wheels, and during the occurrence of edge bending along transition zones between straight and twisted portions of the band guides, a section A-B of the gullet bottom is provided with a radius of curvature 21 which is larger than the depth 20 of the gullet (the section A-B including the deepest point 22 of the gullet). Preferably, that radius is at least 25% larger than the gullet depth 20, preferably from 25 to 50% larger. The portion of the gullet having the relatively large radius 21 extends forwardly from the deepest point 22 for a longitudinal distance 25 which is equal to at least 10% of the pitch 17, and extends rearwardly from the point 22 for a distance 24 which is also equal to at least 10% of the pitch 17. Most preferably, the distance 24 is from 15 to 20% of the pitch, and the distance 25 is greater than 20% of the pitch. Such a configuration of the gullet minimizes the geometrical stress concentration in the vicinity of the deepest point 22.

Fatigue cracks can also occur in the braze joint 16 if the steel part 12 of the tooth is deformed during the repeated bending and twisting of the blade during cutting operations. To minimize that possibility, the steel part 12 of the tooth is made more symmetric and sturdy than usual. This is achieved by a larger than normal longitudinal dimension 18 of the steel part 12 measured along a longitudinal line L which bisects the associated carbide tip 13. Preferably that dimension 18 is at least 20% of the pitch 17. Also, the upper surface 14 of the steel part 12 is raised so that it forms a continuation of (i.e., is aligned with) the upper surface 15 of the carbide tip 13, with no step or discontinuity existing at the braze joint 16. The longitudinal distance 40 between the deepest point 22 of the gullet bottom and the topmost point of the trailing carbide tip, i.e., the carbide tip located behind the gullet, is relatively large, i.e., equal to at least 15% of the pitch 17, in order to minimize the effect of the stress concentration on tooth deformation. That percentage is preferably from 15 to 30%; and most preferably from 20 to 25%.

As thus far described, the blade is of conventional construction. It has also been conventional to subject the bottom 34' of the gullet to a shot-peening operation prior to the brazing of the carbide tips onto the band 10' as depicted in FIG. 2. Such a conventional shot-peening operation involves the blasting of ceramic balls against the gullet bottom 34 from a nozzle N in order to remove flares and scratches from the gullet bottom 34. Following the shot-peening operation, the gullet bottom 34 is characterized by two relatively sharp corners or edges C.

In accordance with the present invention, however, the shot-peening step is formed in such manner as to smoothly round-off the corners of the gullet bottom 34 as shown at 32, 33 in FIG. 3. The shot-peening step is performed by directing the ceramic balls obliquely toward the corners. As a result, the corners are hammered into the rounded shape, thereby eliminating sharp edges and pre-stressing the gullet bottom in compression so that a certain amount of the tensile forces occurring during a cutting operation are taken up in counteracting these preformed compressive forces.

Consequently, the stress concentrations resulting from the presence of sharp corners is reduced, and the cyclical stresses normally occurring during a cutting operation are reduced, thereby delaying the formation of fatigue cracks and enhancing the life of the blade body.

In practice, two stationary nozzles N can be directed obliquely toward the corners, as depicted in FIG. 3. Alternatively, a single nozzle N could be traversed laterally across the gullet bottom 34 between the two depicted nozzle positions, in order to shot-peen the bottom and round-off the corners.

Although the present invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. A method of making a bandsaw blade comprising the steps of:
   providing a steel band having a plurality of steel portions spaced longitudinally apart by curved gullets, each gullet including a bottom having transversely spaced corners;
   brazing carbide tips onto front faces of said steel portions; and shot-peening said corners of said gullet bottom prior to said brazing step to hammer said corners into a smoothly rounded shape and prestress the gullet bottom in compression for enhancing the fatigue resistance of the blade.

2. A method according to claim 1, wherein said shot-peening step comprises shot-peening said corners by two stationary shot-peening nozzles oriented obliquely relative to the plane of said blade.

3. A method according to claim 1, wherein said shot-peening step comprises traversing a shot-peening nozzle transversely across said gullet bottom.

4. A method of making a bandsaw blade comprising the steps of:
   providing a steel band having a plurality of steel portions spaced longitudinally apart by curved gullets, each gullet including a bottom having transversely spaced corners;

brazing carbide tips onto front face of said steel portions such that:
  said steel portions and carbide tips form teeth having a pitch defined by a longitudinal distance between topmost points of successive carbide tips,
  each gullet has a depth defined by a distance from said topmost point of a carbide tip trailing such gullet to a deepest point of such gullet, and said deepest point is spaced longitudinally from said topmost point of said trailing carbide tip by a longitudinal distance equal to at least 15% of said pitch;
  said deepest point lies on a curved section of a bottom of said gullet defined by a radius of curvature which is larger than said depth, and said curved section of said gullet bottom extends longitudinally forwardly and rearwardly of said deepest point by longitudinally forward and rearward distances, respectively, each of which being equal to at least 10% of said pitch; and
  shot-peening said corners of said gullet bottom prior to said brazing step to hammer said corners into a smoothly rounded shape and pre-stress the gullet bottom in compression for enhancing the fatigue resistance of the blade.

5. A method according to claim 4, wherein said shot-peening step comprises shot-peening said corners by two stationary shot-peening nozzles oriented obliquely relative to the plane of said saw blade.

6. A method according to claim 4, wherein said shot-peening step comprises traversing a shot-peening nozzle transversely across said gullet bottom.

* * * * *